No. 864,892. PATENTED SEPT. 3, 1907.
C. H. GRINGS.
PROCESS OF MANUFACTURING HARNESS SADDLES.
APPLICATION FILED OCT. 20, 1906.
3 SHEETS—SHEET 1.
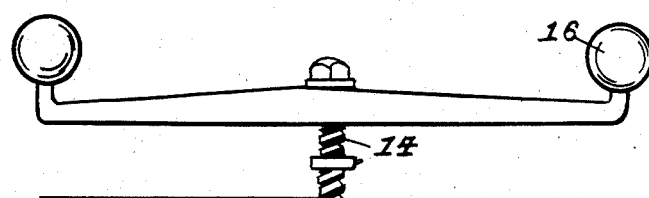
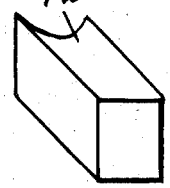
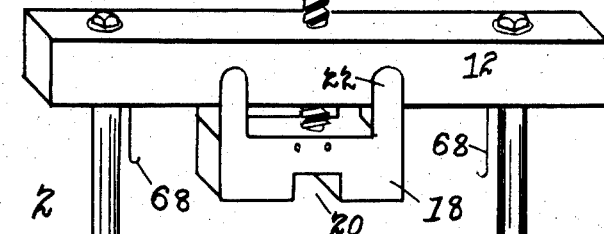
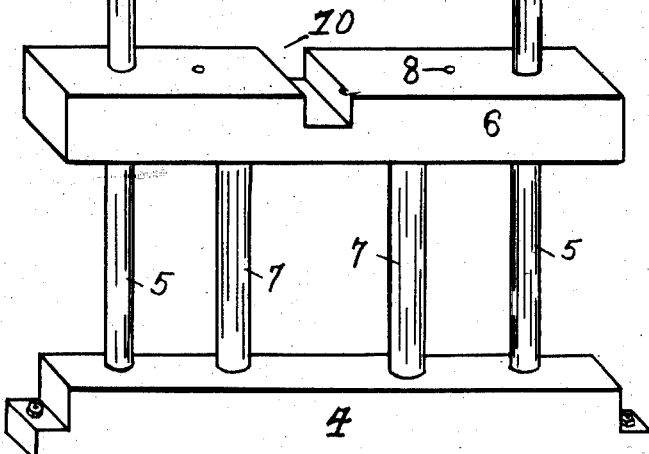
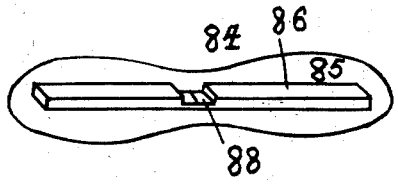
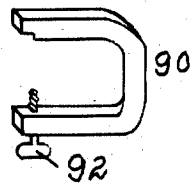
WITNESSES:
INVENTOR.
Casper H. Grings
BY
M. M. Cady
ATTORNEY.

No. 864,892.
PATENTED SEPT. 3, 1907.
C. H. GRINGS.
PROCESS OF MANUFACTURING HARNESS SADDLES.
APPLICATION FILED OCT. 20, 1906.
3 SHEETS—SHEET 2.
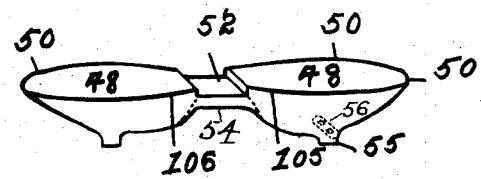
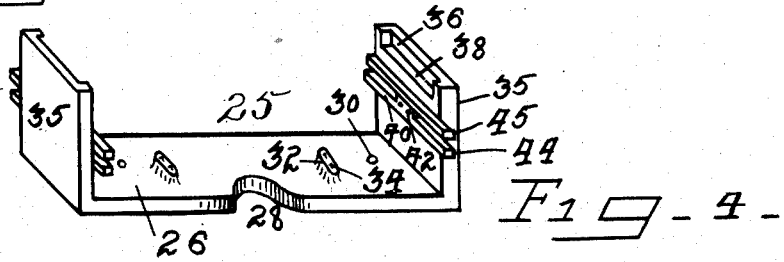
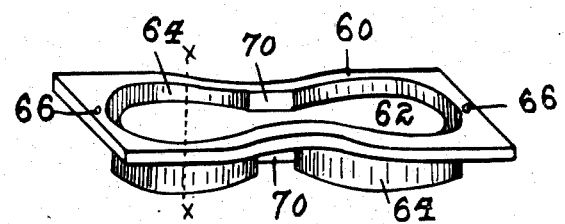
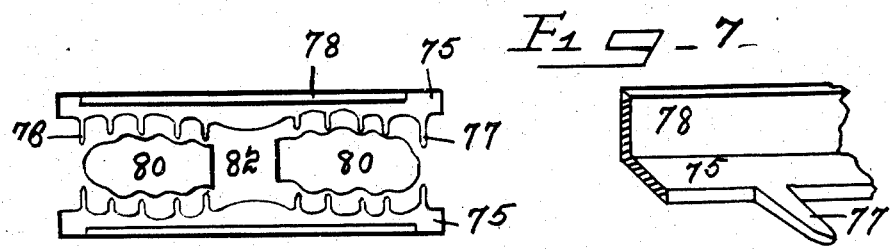
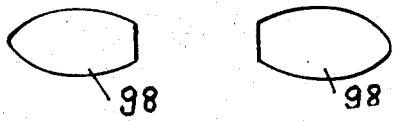
WITNESSES:
B. A. Rochl,
H. B. Keogh
INVENTOR.
Casper H. Grings
BY
M. M. Cady
ATTORNEY No. 864,892. PATENTED SEPT. 3, 1907.
C. H. GRINGS.
PROCESS OF MANUFACTURING HARNESS SADDLES.
APPLICATION FILED OCT. 20, 1906.
3 SHEETS—SHEET 3.
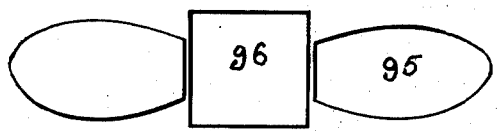
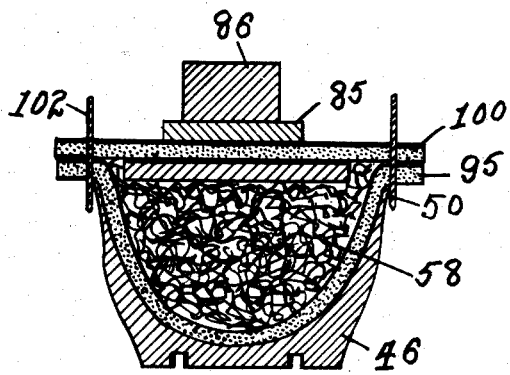
WITNESSES:
INVENTOR.
Casper H. Grings
BY
M. M. Cady
ATTORNEY.

UNITED STATES PATENT OFFICE.

CASPER H. GRINGS, OF DUBUQUE, IOWA, ASSIGNOR OF ONE-HALF TO DUBUQUE HARNESS & SADDLERY COMPANY, OF DUBUQUE, IOWA, A CORPORATION OF IOWA.

PROCESS OF MANUFACTURING HARNESS-SADDLES.

No. 864,892.  Specification of Letters Patent.  Patented Sept. 3, 1907.

Application filed October 20, 1906. Serial No. 339,866.

*To all whom it may concern:*

Be it known that I, CASPER H. GRINGS, a citizen of the United States, residing at Dubuque, in the county of Dubuque and State of Iowa, have invented certain new and useful Improvements in the Processes for Manufacturing Harness-Saddles, of which the following is a specification.

In the manufacture of what is known as sewed bottom harness saddles, the bottom part is usually stitched or united to the bur or top piece before the pads are stuffed. By this mode of construction it is necessary to leave a space at each end for the insertion of the packing material. This process is not only slow and expensive, requiring skilled workmen and much more thread but also results in "lumpiness" and lack of uniformity in the bottoms or pads and necessitates several disconnections of the thread.

The object of my invention is to provide a mode whereby the pads are smoothly and evenly stuffed and are counterparts of each other, also are stitched or united to the bur or top piece after they have been fully packed.

A further object is to stuff the packing in the pad bottom in the mold by uniform pressure and leave the pad bottom projecting out around the mold in such a manner that it may be united to the bur or top piece on the outside of the mold after the pad has been packed and while under pressure.

It consists in a general way, in placing the pad bottom or face covering of the pad in a mold of the size desired and filling the packing into the pad bottom, then submitting the same to pressure within the mold while the edges of the pad bottom project out around the mold, and after the pad is packed and before the pressure is released to place thereon the bur or top piece and stitch it to the pad bottom, preferably by removing it to and stitching it by a sewing machine.

It further consists in means whereby the pressure may be retained on the packed pad, while the bur or top piece is placed in position for fastening and in means whereby the bur piece may be stitched to the pad bottom so close to the outside of the packed pad, that when the pressure is released there will be the minimum of expansion of the compressed packing and the stitching will be continuous and unbroken around the saddle.

The mode of carrying out my process and the utilities attendant thereon will be fully set out in the following specification and drawings accompanying the same and forming a part hereof, which drawings will illustrate a convenient mode of carrying out my process.

Figure 1 is a perspective view of the press. Fig. 2 is a perspective view of the mold. Fig. 3 is a perspective view of the frame that carries the mold shown in Fig. 2. Fig. 4 is a perspective view of the guiding box. Fig. 5 is a cross section through line $x$—$x$ of Fig. 4. Fig. 6 is a perspective view of a block used with Fig. 4. Fig. 7 is a plan view of certain details. Fig. 8 is a perspective view of the retaining plate. Fig. 9 is a perspective view of one of the clamps. Fig. 10 is a plan view of the pad bottom or face covering of the pads before they are placed in the mold. Fig. 11 shows a perspective view of the bur-piece or outer covering of the pads. Fig. 12 is a cross section of the packed pad and mold showing a needle in through the bur-piece and pad bottom and in position for sewing. Fig. 13 is a plan view of the straw boards or flexible plates. Fig. 14 is a perspective view of a portion of the plate 75, shown in Fig. 7.

Like figures of reference denote corresponding parts in each of the drawings.

Referring to the drawings 2, designates a press which consist of a solid base 4 in which are secured posts 5 one near each end. The posts are connected at their top by a plate 12, forming with the base a rectangular frame. Between the base 4 and the top 12, there is placed at a convenient height for the operator, a platform 6 movable vertically on the posts 5 which platform is sustained upon the post 7 fastened in the base 4 and is recessed out at 10 in a rectangular shape. Through the platform 6 are holes 8 for the purposes presently to appear.

Through the top plate 12 is a screw hole provided with threads through which is inserted a screw 14 provided with a lever 15 and knobs or handle 16. To the lower end of the screw 14 is loosely secured a block 18 which block is cut away at 20 to correspond with the recess 10 in the platform 6 and is provided with arms 22, which, when the block 18 is drawn up by the screw, the arms 22 engage on both sides of the plate 12 and serve not only as guides but hold the block 18 from rotating with the screw when it is raised and lowered by the screw.

Upon the plate 6 is removably secured a frame 25 shown in Fig. 3. This frame is constructed of a base plate 26 cut away at 28 and provided with openings 30. Also in the base of the plate are set two lugs 32 which project upward and are provided with pins 34. The ends 35 of the frame 25 are secured to the base plate 26 or cast integral therewith and are cut away at 36, leaving shoulders 38.

Below the shoulder 38 is secured a plate 40 by the bolts 42 and is provided with slots 44, one at each end, leaving the two fingers or arms 45. This frame is rigidly bolted to the platform 6 by bolts through the holes 30 in the frame and holes 8 in the platform.

The mold or packing box 46 is formed with two compartments or molds 48 made preferably of cast metal, having the upper edges 50 very thin with a portion cut away at 52, also cut away on the underside between the molds 48 at 54 and provided with lugs 55 having holes 56. These lugs are set on the bottom of the molds 48 and the pins 34 on the lugs 32 engage the holes 56 and retain the molds in a predetermined position.

For the purpose of aiding in readily and evenly placing the packing in the molds, there is provided a guiding box shown in Fig. 4 which consists of a rectangular plate 60 cut away at 62 in the form of the top of the mold, shown in Fig. 2. To the side of the plate around this opening 62 is secured a thin guide plate 64 preferably made of sheet metal. The plate 60 may be provided with holes 66 there through which are adapted to engage with hooks 68 secured in the under side of the plate 12 and hold up the box 60 at certain times. The guide plates 64 are cut away at 70 for the purpose of providing a space for the insertion of the block 72, shown in Fig. 6. The plate 60 with the guide plate 64 may be made of sheet metal.

For the purpose of retaining the pressure on the mold at a certain time in the process, there are provided two plates 75 which are of the length and thickness to slide into the slots 44 between the fingers 45 of the plate 40. The plates are provided with projections 76 along their edges and with a longer projection 77 near the outer edge and in the rear of the plate is a rib or back 78 to strengthen and to serve as guides for the placing or centering of the bur-piece. Between these two plates 75 are placed two rigid metal plates 80 having irregular curved edges, which are curved to correspond with the projections 76 on the plates 75 so that these projections will not come in contact with the plates 80 where the plates extend to nearly the body of the plate 75. When the plates are in position there is a space 82 between them.

The retaining member 84 shown in Fig. 8 is formed of a base plate 85 to which is secured a bar 86 having a part cut away at 88. In Fig. 9 is shown a clamp 90 bent in nearly rectangular shape with rounded corners and screw threaded in one end in which is inserted a screw 92. This clamp is preferably of the width of one half of the cut away portion 88 for the purposes presently to appear. There is also provided two straw boards or flexible plates 98.

The manner in which the various parts are assembled and the mode whereby the process is carried out is substantially as follows. Starting with the frame 25, shown in Fig. 3, securely bolted upon the platform as before described, the operator places the mold 46, upon the frame 25 with the holes 56 in engagement with the pins 34, whereby the correct position of the mold is quickly determined. He then places the pad bottoms 95 for the pads over the molds 48, and the central strip of leather 96 over 52 and places thereon guide box 60 with the ends of the box on the shoulders 38 and the block 72 in the opening 70. The leather or pad bottoms 95 are pressed down into the molds with their edges projecting outward over the top of the molds, and the packing is thrown in on top of them through the guide box 60 until there is sufficient to fill the molds and as the block 72 is between the two molds 48, each mold will have a separate packing. The size of the guide box will determine the amount of packing and as each compartment is of the same size, there will be a uniformity in the packing in the two pads. After the packing is distributed in the molds there is placed upon the top of the packing a follow board 98, which is preferably made of paste board or some other rigid though flexible material, and over these the steel plates 80. Then the operator grasps the handles 16 of the lever 15 and screws down the block 18 into the plates 80 and compresses the packing into the mold. When it has been sufficiently compressed, the operator raises the guide box 60, holds it up by the engagement of the hooks 68 with the holes 66 and removes the block 72. Then the operator slides the plates 75 into the slots 44 on each side and the points 76 project over upon the paste boards 98. The screw 14 is reversed and the pressure by the block 18 upon the plates 80 is removed, but the pressure upon the packing is retained by the plates 75, and the boards 98. The plates 80 are removed and the bur piece 100 is placed within the plates 75 and by the backs 78 of these plates and their ends 77 the bur piece 100 is centered in the proper place therein over the molds. The retaining bar 84 shown in Fig. 8 is then placed upon the bur piece 100 and the press is again brought down until just as it touches the top of the bar 86 and while it is going down the plates 75 are withdrawn and the original pressure is placed upon the packing through the retaining bar 84. Then the clamp shown in Fig. 9 is brought into action and is inserted through the openings 20 and 10 and the cut away space 54 resting upon one side of the space 52 next to one of the molds and the screw 92 is tightened. Then the pressure from the screw 14 is released. The various parts will now have the position shown in Fig. 12, with the edges of the pad bottom 95 still projecting outwardly over the mold, and the bur or top piece 100 resting upon these edges over the mold and in position to be united together, and the retaining plate 84 held upon the bur piece 100 by the clamp 90 and holding the packing within the mold still under pressure of the clamp. The operator now removes the mold 46 from the frame 25, with the packing therein still under pressure by the clamps, and takes it to the stitching machine. It will now be seen that as the edges of the pad bottom and the bur piece project out over the mold and as the mold is exceedingly thin at the top, the needle 102 can stitch the bur-piece and pad bottom together close up to the packing. The operator of the stitching machine preferably commences to stitch at, say 105, as shown in Fig. 2, stitching around to the right of the mold and then around the left until he comes to 106, then he places a clamp similar to the clamp 90 upon the opposite side of the mold and removes the original clamp 90. He then can stitch through to the point 105 the place of beginning and finish the stitching. It will also be observed that one operator having several molds 46 can devote his time exclusively to packing the molds and another to the fastening or stitching and that neither of them need necessarily be skilled or expert workmen. In this manner the pads may be packed and saddles finished in a comparatively short time with an unbroken stitch, no waste of thread and uniformity and evenness of packing.

It will be seen that the stitching or uniting is with an unbroken thread entirely around both of the pads after the pads have been packed and while the packing is still under pressure and compressed in the mold and that the stitching is close to the packing, also, when the operator has reached the point 105 the pad bottoms and the bur-piece are united together entirely around both of the pads and across the leather strips 96 between the pads.

Having now described my invention what I claim is;

1. The process of manufacturing harness saddles which consist in first compressing the packing in the pad bottoms within the mold, placing the bur-piece upon the compressed packing in mold, removing the mold with the packed pads therein from the press and retaining the pressure on the bur-piece and packing within the mold, then uniting the bur-piece and the pad bottom while the pads and bur-piece are under pressure within the mold.

2. The process for manufacturing harness saddles, which consists in first packing the pads in a mold placing the bur-piece upon the packed pads without releasing the pressure on the packed pads in the mold, then removing the mold with the compressed packing therein and wholly stitching the pad bottoms to the bur-piece after packing while the pads are within the mold and under pressure.

3. The process of manufacturing harness saddles, which consists in placing the pad bottoms in a mold with their edges projecting over the edges of the mold, compressing the packing into the pad bottoms within the mold, placing the bur or top piece over the compressed packing and upon the projecting edges of the pad bottom then uniting the edges of the pad bottoms and the bur piece together while under pressure.

4. The process of manufacturing harness saddles, which consists in placing the pad bottoms in molds with their edges projecting over the molds, compressing the packing into the bottoms within the molds, placing the bur or top piece over the molds and upon the projecting edges of the pad bottoms while the pads are under pressure, then stitching the pad bottoms to the bur-piece while the pads and bur-piece are under pressure.

5. The process for the manufacture of harness pads which consists in compressing the packing into the pad bottoms within the molds with the edges of the pad bottom projecting outwardly over the edges of the molds, clamping the top or bur-piece over the molds upon the edges of the pad bottoms while the pads are under pressure in the molds, removing the pack pads and bur-piece from the press and uniting the bur-piece to the pad bottom after the pads are packed and while under pressure in the molds and by a continuous stitch.

6. The process for manufacturing harness saddles, which consists in placing the pad bottoms in the molds, compressing the packing into the pad bottoms in the molds, retaining the pressure on the pads while the bur or top piece is adjusted over the pad bottoms and compressed packing in the mold, then stitching the pad bottoms to the bur-piece with a continuous or unbroken stitch after the pads are packed and while the pads are under pressure in the mold.

7. The process of manufacturing harness saddles which consists first in placing the pad bottoms in molds with their edges projecting over the edges of the mold, then packing the pad bottoms within the molds, compressing the packing in the molds and holding the packing compressed while the pressure from the press is removed, placing the bur-piece over the compressed packing with the edges resting upon the pad bottoms and retaining the pressure thereon, removing the mold with the compressed packing and bur-piece thereon, and stitching the pads and bur-piece together by a continuous or unbroken stitch after the pads are packed and while the packing and bur-piece are under pressure within the mold.

In testimony whereof I have signed my name to this specification in the presence of two subscribing witnesses.

CASPER H. GRINGS.

Witnesses:
M. M. CADY,
C. D. ROEHL.